(12) United States Patent
Wiegert

(10) Patent No.: US 7,958,724 B2
(45) Date of Patent: Jun. 14, 2011

(54) TORQUE CONVERTER BLADE

(75) Inventor: Benedikt Wiegert, Oberkirch (DE)

(73) Assignee: Schaeffler Technologies GmbH & Co. KG, Herzogenaurach (DE)

(*) Notice: Subject to any disclaimer, the term of this patent is extended or adjusted under 35 U.S.C. 154(b) by 548 days.

(21) Appl. No.: 12/157,487

(22) Filed: Jun. 11, 2008

(65) Prior Publication Data

US 2008/0308373 A1    Dec. 18, 2008

Related U.S. Application Data

(60) Provisional application No. 60/934,675, filed on Jun. 15, 2007.

(51) Int. Cl.
*F16D 33/20* (2006.01)
*F16H 41/00* (2006.01)

(52) U.S. Cl. .......................... 60/366; 60/364

(58) Field of Classification Search .............. 60/364, 60/365, 366, 367; 416/180, 197 C
See application file for complete search history.

(56) References Cited

U.S. PATENT DOCUMENTS

| | | | | |
|---|---|---|---|---|
| 2,264,002 A * | 11/1941 | Neracher et al. | ............... | 60/365 |
| 2,599,461 A * | 6/1952 | Koskinen | ................ | 60/365 |
| 2,632,396 A * | 3/1953 | Koskinen | ................ | 60/367 |
| 2,632,397 A * | 3/1953 | Jandasek | ................ | 60/365 |
| 2,660,957 A * | 12/1953 | Koskinen | ................ | 60/367 |
| 3,545,883 A * | 12/1970 | Iijima | ................ | 60/367 |
| 3,673,659 A | 7/1972 | Ishii et al. | | |
| 3,817,656 A | 6/1974 | Batteux | | |
| 3,891,350 A * | 6/1975 | Adachi et al. | ................ | 416/180 |
| 5,794,436 A * | 8/1998 | Maeda | ................ | 60/367 |
| 5,893,704 A | 4/1999 | Prater | | |
| 6,360,533 B1 * | 3/2002 | Turner et al. | ................ | 60/364 |

* cited by examiner

*Primary Examiner* — Thomas E Lazo

(74) *Attorney, Agent, or Firm* — Simspon & Simpson, PLLC

(57) ABSTRACT

A blade for a torque converter including a body having an outer edge, the outer edge arranged to conform to an inner surface of a shell in the torque converter, the shell having at least two slots arranged therethrough, and a surface extending from the outer edge, the surface having at least two tabs, wherein the surface is arranged to conform to the inner surface of the shell to provide a fluid seal, the at least two tabs are disposed through the at least two slots and at least one of the at least two tabs is arranged to engage an outer surface of the shell. The invention further includes a torque converter including the present invention blades and a method of assembling the same.

28 Claims, 11 Drawing Sheets

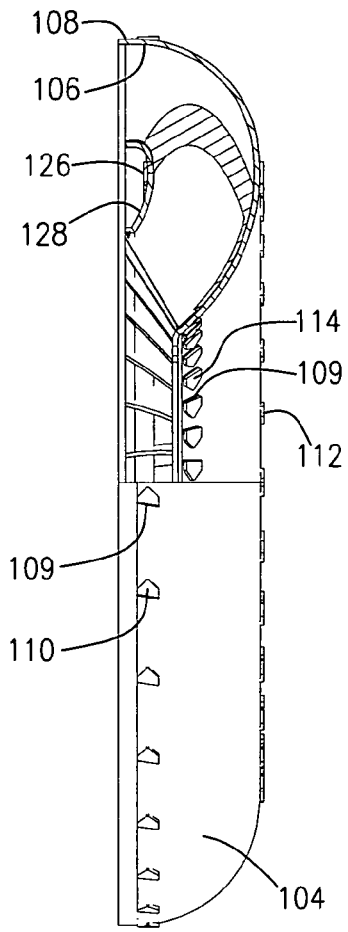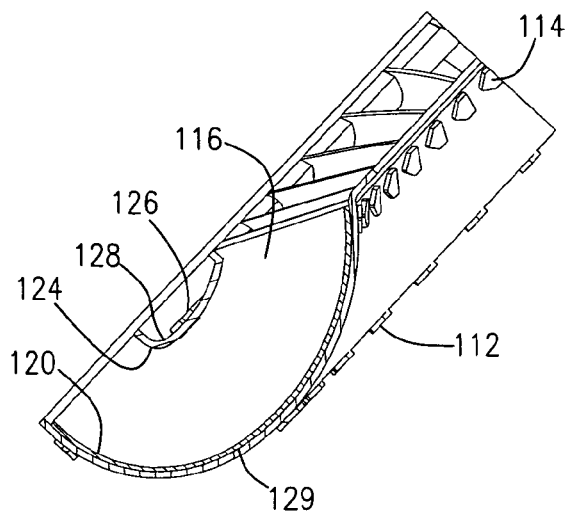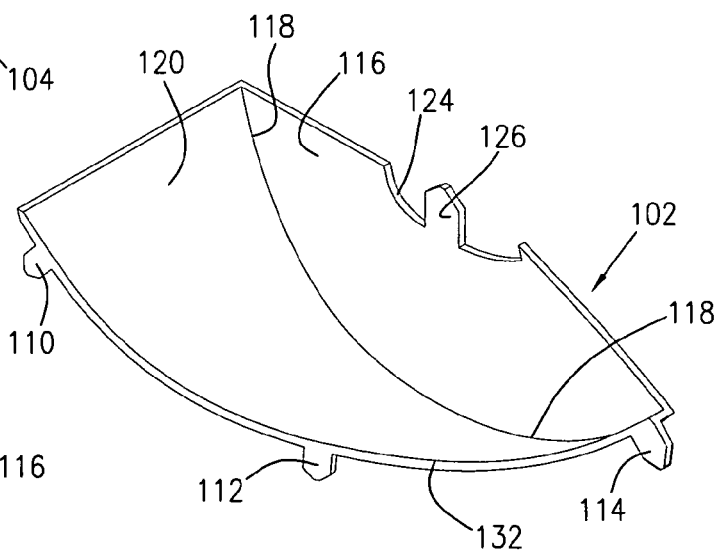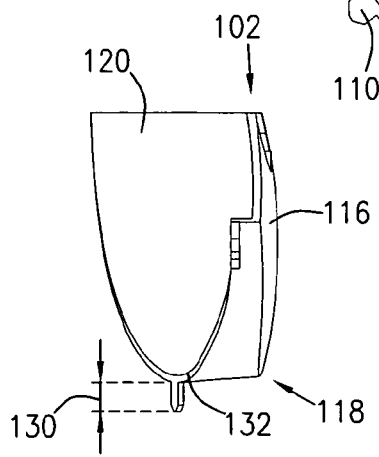
FIG. 11
FIG. 12
FIG. 13
FIG. 14

TORQUE CONVERTER BLADE

CROSS-REFERENCE TO RELATED APPLICATIONS

This application claims the benefit under 35 U.S.C. §119 (e) of U.S. Provisional Application No. 60/934,675 filed on Jun. 15, 2007 which application is incorporated herein by reference.

FIELD OF THE INVENTION

The invention broadly relates to torque converters, more specifically to a torque converter blade, and even more particularly to a torque converter blade which provides a fluid seal without brazing or other bonding operations.

BACKGROUND OF THE INVENTION

Hydraulic torque converters, devices used to change the ratio of torque to speed between the input and output shafts of the converter, revolutionized the automotive and marine propulsion industries by providing hydraulic means to transfer energy from an engine to a drive mechanism, e.g., drive shaft or automatic transmission, while smoothing out engine power pulses. A torque converter, arranged between the engine and the transmission, typically includes three primary components: an impeller, sometimes referred to as a pump, directly connected to the converter's cover and thereby the engine's crankshaft; a turbine, similar in structure to the impeller, however the turbine is connected to the input shaft of the transmission; and, a stator, located between the impeller and turbine, which redirects the flow of hydraulic fluid exiting from the turbine thereby providing additional rotational force to the pump.

FIG. 1 illustrates a general block diagram showing the relationship of the engine 7, torque converter 10, transmission 8, and differential/axle assembly 9 in a typical vehicle. FIG. 2 shows a cross-sectional view of a prior art torque converter, shown secured to an engine of a motor vehicle, while FIG. 3 shows a left view of the torque converter shown in FIG. 2, taken generally along line 3-3 in FIG. 2. FIG. 4 shows a cross-sectional view of the torque converter shown in FIGS. 2 and 3, taken generally along line 4-4 in FIG. 3. FIG. 5 shows a first exploded view of the torque converter shown in FIG. 2, as shown from the perspective of one viewing the exploded torque converter from the left, while FIG. 6 shows a second exploded view of the torque converter shown in FIG. 2, as shown from the perspective of one viewing the exploded torque converter from the right. The following discussion is best understood in view of FIGS. 1 through 6.

As described above, the three main components of torque converter 10 are pump 37, turbine 38, and stator 39. The torque converter becomes a sealed chamber when the pump is welded to cover 11. The cover is connected to flexplate 41 which is, in turn, bolted to crankshaft 42 of engine 7. The cover can be connected to the flexplate using lugs or studs welded to the cover. The welded connection between the pump and cover transmits engine torque to the pump. Therefore, the pump always rotates at engine speed. The function of the pump is to use this rotational motion to propel the fluid radially outward and axially towards the turbine. Therefore, the pump is a centrifugal pump propelling fluid from a small radial inlet to a large radial outlet, increasing the energy in the fluid. Pressure to engage transmission clutches and the torque converter clutch is supplied by an additional pump in the transmission that is driven by the pump hub.

In torque converter 10, a fluid circuit is created by the pump, the turbine, and the stator (sometimes called a reactor). The fluid circuit allows the engine to continue rotating when the vehicle is stopped, and accelerate the vehicle when desired by a driver. The torque converter supplements engine torque through torque ratio, similar to a gear reduction. Torque ratio is the ratio of output torque to input torque. Torque ratio is highest at low or no turbine rotational speed (also called stall). Stall torque ratios are typically within a range of 1.8-2.2. This means that the output torque of the torque converter is 1.8-2.2 times greater than the input torque. Output speed, however, is much lower than input speed, because the turbine is connected to the output and it is not rotating, but the input is rotating at engine speed.

Turbine 38 uses the fluid energy it receives from pump 37 to propel the vehicle. Turbine shell 22 is connected to turbine hub 19. Turbine hub 19 uses a spline connection to transmit turbine torque to transmission input shaft 43. The input shaft is connected to the wheels of the vehicle through gears and shafts in transmission 8 and axle differential 9. The force of the fluid impacting the turbine blades is output from the turbine as torque. Axial thrust bearings 31 support the components from axial forces imparted by the fluid. When output torque is sufficient to overcome the inertia of the vehicle at rest, the vehicle begins to move.

After the fluid energy is converted to torque by the turbine, there is still some energy left in the fluid. The fluid exiting from small radial outlet 44 would ordinarily enter the pump in such a manner as to oppose the rotation of the pump. Stator 39 is used to redirect the fluid to help accelerate the pump, thereby increasing torque ratio. Stator 39 is connected to stator shaft 45 through one-way clutch 46. The stator shaft is connected to transmission housing 47 and does not rotate. One-way clutch 46 prevents stator 39 from rotating at low speed ratios (where the pump is spinning faster than the turbine). Fluid entering stator 39 from turbine outlet 44 is turned by stator blades 48 to enter pump 37 in the direction of rotation.

The blade inlet and exit angles, the pump and turbine shell shapes, and the overall diameter of the torque converter influence its performance. Design parameters include the torque ratio, efficiency, and ability of the torque converter to absorb engine torque without allowing the engine to "run away." This occurs if the torque converter is too small and the pump can't slow the engine.

At low speed ratios, the torque converter works well to allow the engine to rotate while the vehicle is stationary, and to supplement engine torque for increased performance. At speed ratios less than 1, the torque converter is less than 100% efficient. The torque ratio of the torque converter gradually reduces from a high of about 1.8 to 2.2, to a torque ratio of about 1 as the turbine rotational speed approaches the pump rotational speed. The speed ratio when the torque ratio reaches 1 is called the coupling point. At this point, the fluid entering the stator no longer needs redirected, and the one way clutch in the stator allows it to rotate in the same direction as the pump and turbine. Because the stator is not redirecting the fluid, torque output from the torque converter is the same as torque input. The entire fluid circuit will rotate as a unit.

Peak torque converter efficiency is limited to 92-93% based on losses in the fluid. Therefore torque converter clutch 49 is employed to mechanically connect the torque converter input to the output, improving efficiency to 100%. Clutch piston plate 17 is hydraulically applied when commanded by the transmission controller. Piston plate 17 is sealed to turbine hub 19 at its inner diameter by o-ring 18 and to cover 11 at its outer diameter by friction material ring 51. These seals create a pressure chamber and force piston plate 17 into engagement with cover 11. This mechanical connection bypasses the torque converter fluid circuit.

The mechanical connection of torque converter clutch 49 transmits many more engine torsional fluctuations to the drivetrain. As the drivetrain is basically a spring-mass system, torsional fluctuations from the engine can excite natural frequencies of the system. A damper is employed to shift the drivetrain natural frequencies out of the driving range. The damper includes springs 15 in series with engine 7 and transmission 8 to lower the effective spring rate of the system, thereby lowering the natural frequency.

Torque converter clutch 49 generally comprises four components: piston plate 17, cover plates 12 and 16, springs 15, and flange 13. Cover plates 12 and 16 transmit torque from piston plate 17 to compression springs 15. Cover plate wings 52 are formed around springs 15 for axial retention. Torque from piston plate 17 is transmitted to cover plates 12 and 16 through a riveted connection. Cover plates 12 and 16 impart torque to compression springs 15 by contact with an edge of a spring window. Both cover plates work in combination to support the spring on both sides of the spring center axis. Spring force is transmitted to flange 13 by contact with a flange spring window edge. Sometimes the flange also has a rotational tab or slot which engages a portion of the cover plate to prevent over-compression of the springs during high torque events. Torque from flange 13 is transmitted to turbine hub 19 and into transmission input shaft 43.

Energy absorption can be accomplished through friction, sometimes called hysteresis, if desired. Hysteresis includes friction from windup and unwinding of the damper plates, so it is twice the actual friction torque. The hysteresis package generally consists of diaphragm (or Belleville) spring 14 which is placed between flange 13 and one of cover plates 16 to urge flange 13 into contact with the other cover plate 12. By controlling the amount of force exerted by diaphragm spring 14, the amount of friction torque can also be controlled. Typical hysteresis values are in the range of 10-30 Nm.

Although assembling blades within a torque converter housing, at first glance, may appear trivial, manufacturing constraints and requirements make the task quite difficult. A shell is formed, e.g., typically by stamping, slots are coined into the shell and subsequently blades are positioned within slots in the shell. Traditionally, the blades have been connected to their respective shell by means of welding. It is to be understood that "welding" in this sense is to be broadly construed. "Welding" is intended to include the following:

Direct fusion of the blades to the shell of the turbine by melting and subsequently hardening at their interface;

Connection by means of an intermediate or connecting molten metal as occurs in gas or arc welding using a metal connecting material usually selected from copper, iron and alloys of at least two of iron, copper, tin, zinc, lead, aluminum, silver, cobalt, chromium and nickel, an example of this method is described in U.S. Pat. No. 3,673,659; and, Connection using plastic material that is usually a cross linked organic plastic such as an epoxy resin, e.g., as described in U.S. Pat. No. 3,817,656.

The most common form of welding utilized in constructing torque converters has been brazing.

It has been suggested that blades might be secured without welding by utilizing mechanical fastening such as tabs on a blade that are inserted into slots or recesses in a turbine shell. Unfortunately, such devices have had serious disadvantages.

A major disadvantage has been that the blade is not held as securely as when welding is used and the blade may thus vibrate to cause noise, part wear and eventual catastrophic failure. Examples of such devices are described in U.S. Pat. Nos. 2,660,957; 3,673,659; 5,794,436; and, 5,893,704.

A further major disadvantage has been that there has been an inability, by such mechanical fastening, to obtain a tight fit of the blade with the turbine shell. This results in significant inefficiency since fluid within the turbine can pass between the blade and the turbine body thus failing to direct the kinetic energy in that fluid to the turbine and thereby the input shaft of the transmission. Examples of such devices are described in U.S. Pat. Nos. 2,660,957; 3,673,659; and, 5,794,436.

Yet another disadvantage is that the mechanical method of attachment may be difficult, complex or time consuming, e.g., rivets or similar connectors are required or the blades and shells are of complex shapes that are difficult or expensive to manufacture and may require complex interlocking arrangements. Examples of such devices are disclosed in U.S. Pat. Nos. 2,660,957; 3,673,659; and, 5,794,436.

U.S. Pat. No. 5,893,704 describes a structure wherein tabs on the blades are described that fit within recesses in the shell of a turbine. An advantage resulting from this structure is that fluid flow between the blades and the shell is restricted thus increasing efficiency. Unfortunately, the increased efficiency is not as great as desired because fluid flow around the blade is only stopped at the location of the tab and fluid can still flow around the vane at other locations because the tab, as a practical matter, cannot be expected to hold the rest of the edge of the blade tightly against the body. This is true at least due to variations in insertable distance of the tab and variations in curvature of the body relative to curvature of the blade. A further serious disadvantage of this structure is that there is no positive holding force applied to the blade since the tab does not pass through the shell of the turbine but merely rests within a depression by friction.

All of the United States Patents described above are incorporated by reference herein as background art.

As can be derived from the variety of devices and methods directed at assembling a torque converter, many means have been contemplated to accomplish the desired end, i.e., retention of a blade within a shell, without the need for expensive welding operations, and thus resulting in lower assembly cost and complexity. Heretofore, tradeoffs between welding techniques and expense for such methods and steps were required. Thus, there has been a long felt need for a torque converter shell having a blade affixed without welding operations, while introducing minimal changes to the overall process of assembly.

BRIEF SUMMARY OF THE INVENTION

In accordance with the present invention, a torque converter structure is provided wherein a plurality of high efficiency weld free connections between at least one of the pump and its blades and the turbine and its blades that overcomes or reduces the disadvantages associated with prior torque converters as described in the BACKGROUND OF THE INVENTION above.

The present invention broadly comprises a blade for a torque converter including a body having an outer edge, the outer edge arranged to conform to an inner surface of a shell in the torque converter, the shell including at least two slots arranged therethrough, and a surface extending from the outer edge, the surface including at least two tabs, wherein the surface is arranged to conform to the inner surface of the shell to provide a fluid seal, the at least two tabs are disposed through the at least two slots and at least one of the at least two tabs is arranged to engage an outer surface of the shell. In some embodiments, each of the at least two slots has a depth and at least one of the at least two tabs has a length greater than the depth of at least one of the at least two slots. In other embodiments, the surface extends substantially perpendicularly from the body, and in yet other embodiments, an angle formed between the surface and the body is acute. In still other embodiments, the at least two tabs extend from an edge of the surface opposite the outer edge of the body, while in still yet other embodiments, the body further includes an inner edge having at least one tab arranged to engage a core ring. In some embodiments, the shell is a turbine shell, while in other embodiments the shell is a pump shell.

The present invention also broadly comprises a torque converter including a shell having inner and outer surfaces and at least two slots arranged therethrough and a blade including a body having an outer edge arranged to conform to the inner surface of the shell, a surface extending from the outer edge, and at least two tabs extending from the surface, wherein the surface is arranged to conform to the inner surface of the shell to provide a fluid seal, the at least two tabs are disposed through the at least two slots and at least one of the at least two tabs is arranged to engage an outer surface of the shell. In some embodiments, each of the at least two slots has a depth and at least one of the at least two tabs has a length greater than the depth of at least one of the at least two slots. In other embodiments, the surface extends substantially perpendicularly from the body, and in yet other embodiments, an angle formed between the surface and the body is acute. In still other embodiments, the at least two tabs extend from an edge of the surface opposite the outer edge of the body, while in still yet other embodiments, the body further includes an inner edge having at least one tab arranged to engage a core ring. In some embodiments, the shell is a turbine shell, while in other embodiments the shell is a pump shell.

Furthermore, the present invention also broadly comprises a torque converter including a shell having inner and outer surfaces and at least two slots arranged therethrough, a blade including a body having an outer edge and a surface extending from the outer edge and at least two tabs extending from the surface, the outer edge and the surface arranged to conform to the inner surface of the shell and a fluid seal including an interface between the inner surface of the shell and the surface extending from the outer edge, wherein the at least two tabs are disposed through the at least two slots and at least one of the at least two tabs is arranged to engage an outer surface of the shell. In some embodiments, each of the at least two slots has a depth and at least one of the at least two tabs has a length greater than the depth of at least one of the at least two slots. In other embodiments, the surface extends substantially perpendicularly from the body, and in yet other embodiments, an angle formed between the surface and the body is acute. In still other embodiments, the at least two tabs extend from an edge of the surface opposite the outer edge of the body, while in still yet other embodiments, the body further includes an inner edge having at least one tab arranged to engage a core ring. In some embodiments, the shell is a turbine shell, while in other embodiments the shell is a pump shell.

Moreover, the present invention further comprises a method for assembling a blade in a torque converter shell, the shell includes inner and outer surfaces and at least two slots arranged therethrough and the blade includes a body having an outer edge arranged to conform to the inner surface of the shell, a surface extending from the outer edge, and at least two tabs extending from the surface, wherein the surface is arranged to conform to the inner surface of the shell, the method including the steps of: a) inserting the at least two tabs through the at least two slots; and, b) bending at least one of the at least two tabs to engage the outer surface and retain the surface extending from the outer edge against the inner surface of the shell. In some embodiments, the method further includes the step of: c) providing a fluid seal between the surface extending from the outer edge and the inner surface of the shell. In other embodiments, each of the at least two slots has a depth and at least one of the at least two tabs has a length greater than the depth of at least one of the at least two slots. In yet other embodiments, the surface extends substantially perpendicularly from the body, and in still yet other embodiments, an angle formed between the surface and the body is acute. In still further embodiments, the body includes an inner edge having at least one tab arranged to engage a core ring. In some embodiments, the shell is a turbine shell, while in other embodiments the shell is a pump shell.

These and other objects and advantages of the present invention will be readily appreciable from the following description of preferred embodiments of the invention and from the accompanying drawings and claims.

BRIEF DESCRIPTION OF THE DRAWINGS

The nature and mode of operation of the present invention will now be more fully described in the following detailed description of the invention taken with the accompanying drawing figures, in which:

FIG. 11 is a cross sectional view of the torque converter turbine of FIGS. 8 and 9 taken generally along line 11-11 in FIG. 9;

FIG. 12 is a cross sectional view of the torque converter turbine of FIGS. 8 and 9 taken generally along line 12-12 in FIG. 9;

FIG. 13 is a perspective view of a present invention torque converter blade;

FIG. 14 is a front elevational view of the torque converter blade of FIG. 13;

DETAILED DESCRIPTION OF THE INVENTION

At the outset, it should be appreciated that like drawing numbers on different drawing views identify identical, or functionally similar, structural elements of the invention. While the present invention is described with respect to what is presently considered to be the preferred aspects, it is to be understood that the invention as claimed is not limited to the disclosed aspects.

Furthermore, it is understood that this invention is not limited to the particular methodology, materials and modifications described and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. It should be appreciated that the term "blades" is synonymous with the term such as "vanes", such terms may be used interchangeably as appearing in the specification and claims, and mean the structures protruding from the shells of the pump and turbine having surfaces that, in the case of the pump, expel fluid or, in the case of the turbine, surfaces that receive the force of fluid expelled from the pump to rotate the turbine. It should also be appreciated that the term "fluid seal," as used in the specification and the claims, means either no fluid or a small amount of fluid may pass by or through the seal. In other words, "fluid seal" is not used exclusively to describe a complete seal, but also to describe a nearly complete seal. Although any methods, devices or materials similar or equivalent to those described herein can be used in the practice or testing of the invention, the preferred methods, devices, and materials are now described.

The invention is a torque converter having a plurality of high efficiency weld free connections between at least one of the pump and its blades and the turbine and its blades that overcomes or reduces the disadvantages associated with prior torque converters as described in the BACKGROUND OF THE INVENTION above.

In particular, the torque converter of the invention does not require welding of blades to the shells of the pump and/or the turbine; the blades are held securely so as to reduce or eliminate vibration, noise and catastrophic failure. Gaps between the blades and the shells are largely blocked to greatly reduce fluid by-pass, i.e., fluid leaking between blade and shell, thus increasing efficiency and the parts are simple to manufacture and assemble.

Figure 1:
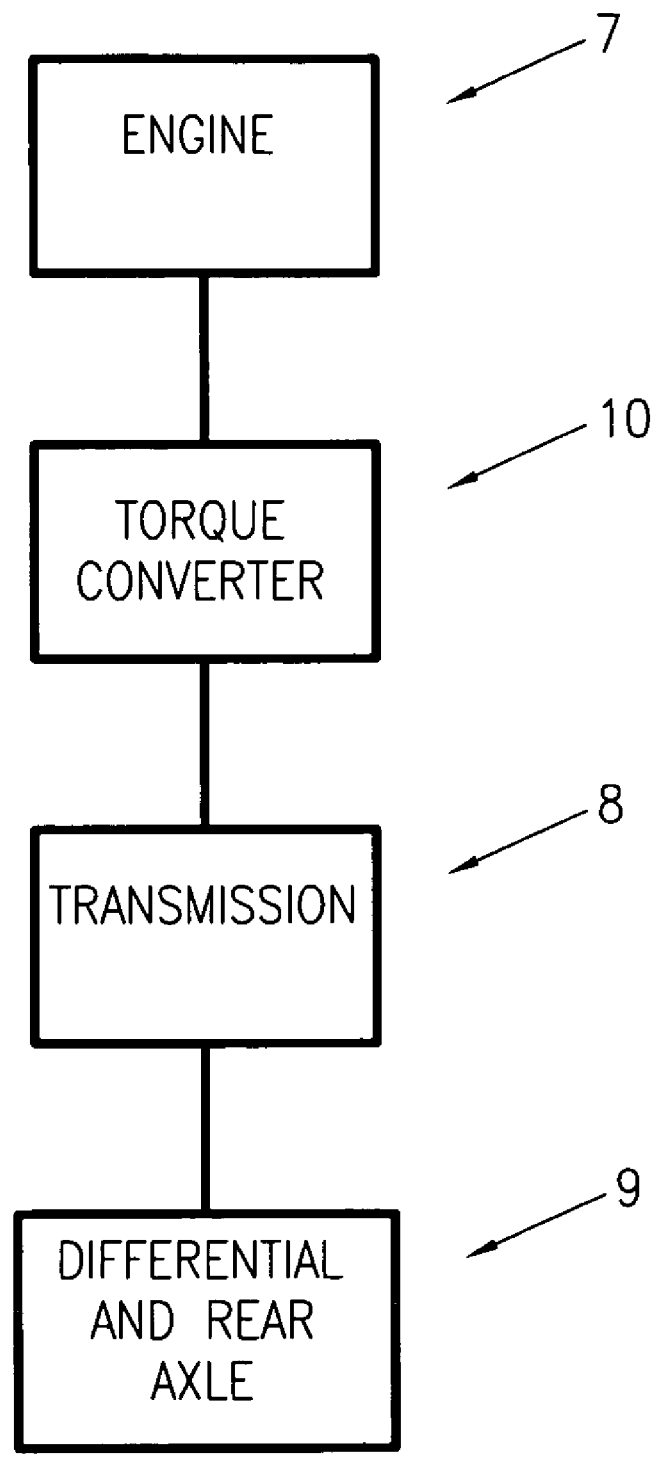
FIG. 1 is a general block diagram illustration of power flow in a motor vehicle, intended to help explain the relationship and function of a torque converter in the drive train thereof.
Figure 2:
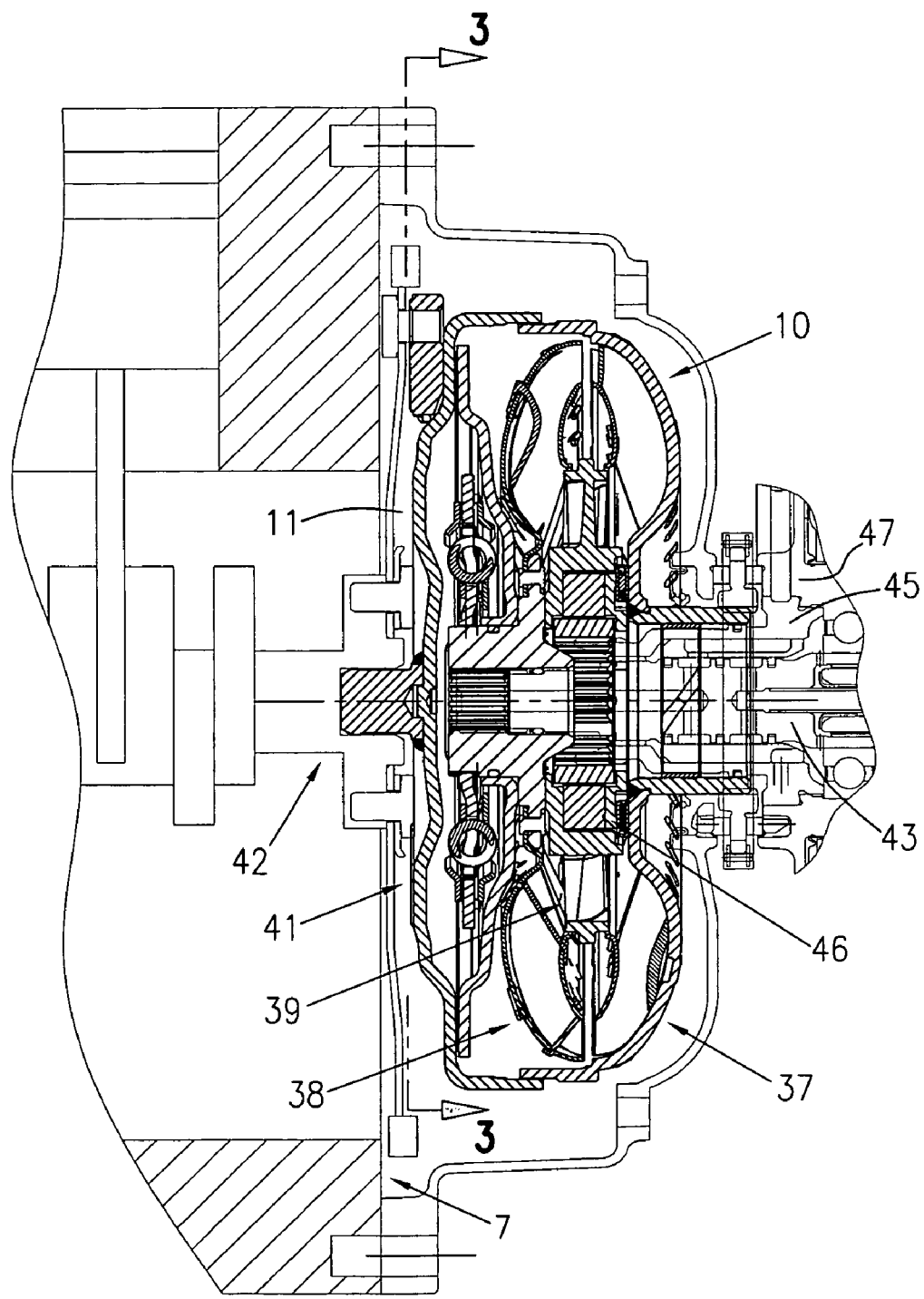
FIG. 2 is a cross-sectional view of a prior art torque converter, shown secured to an engine of a motor vehicle.
Figure 3:
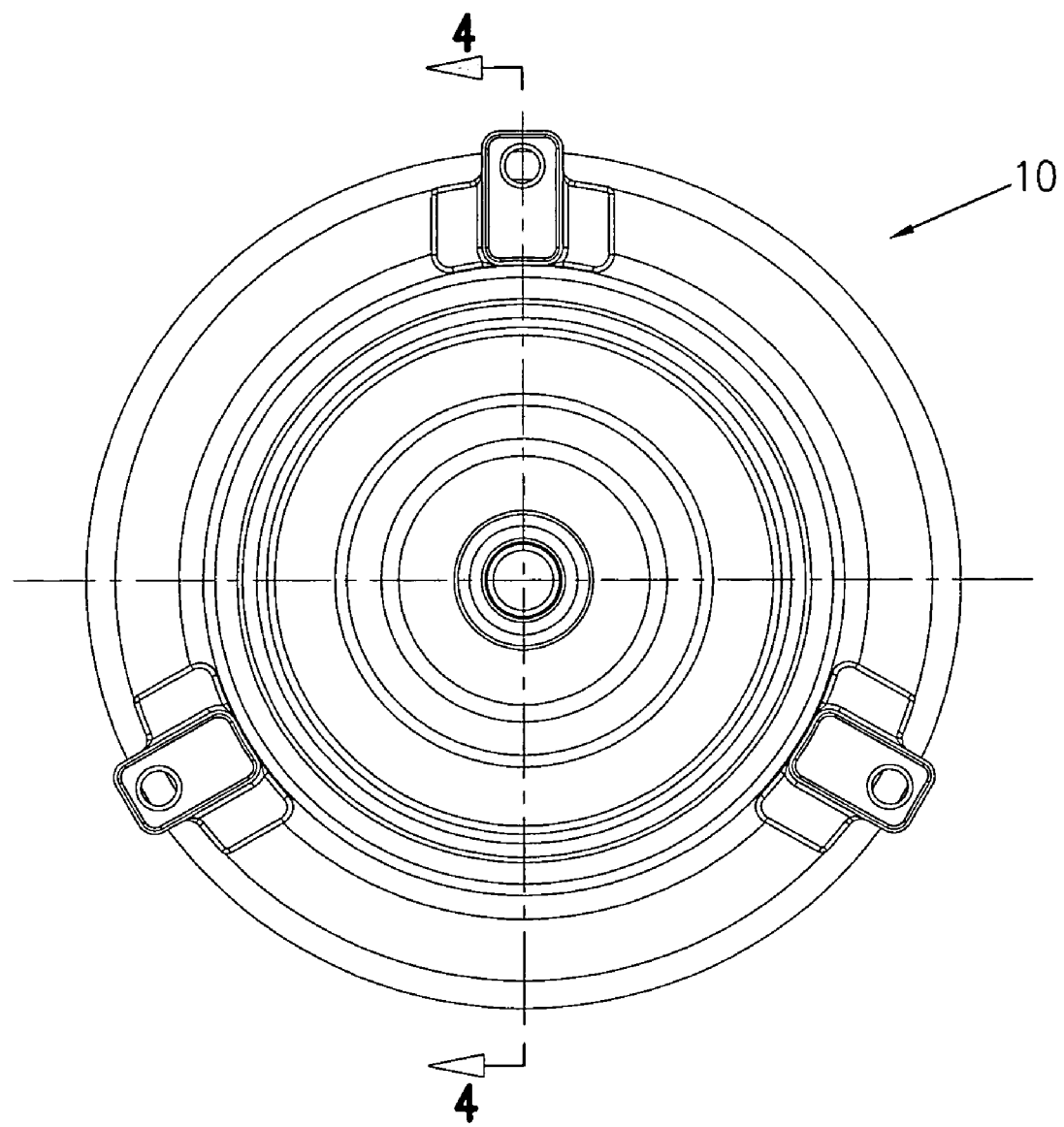
FIG. 3 is a left view of the torque converter shown in FIG. 2, taken generally along line 3-3 in FIG. 2.
Figure 4:
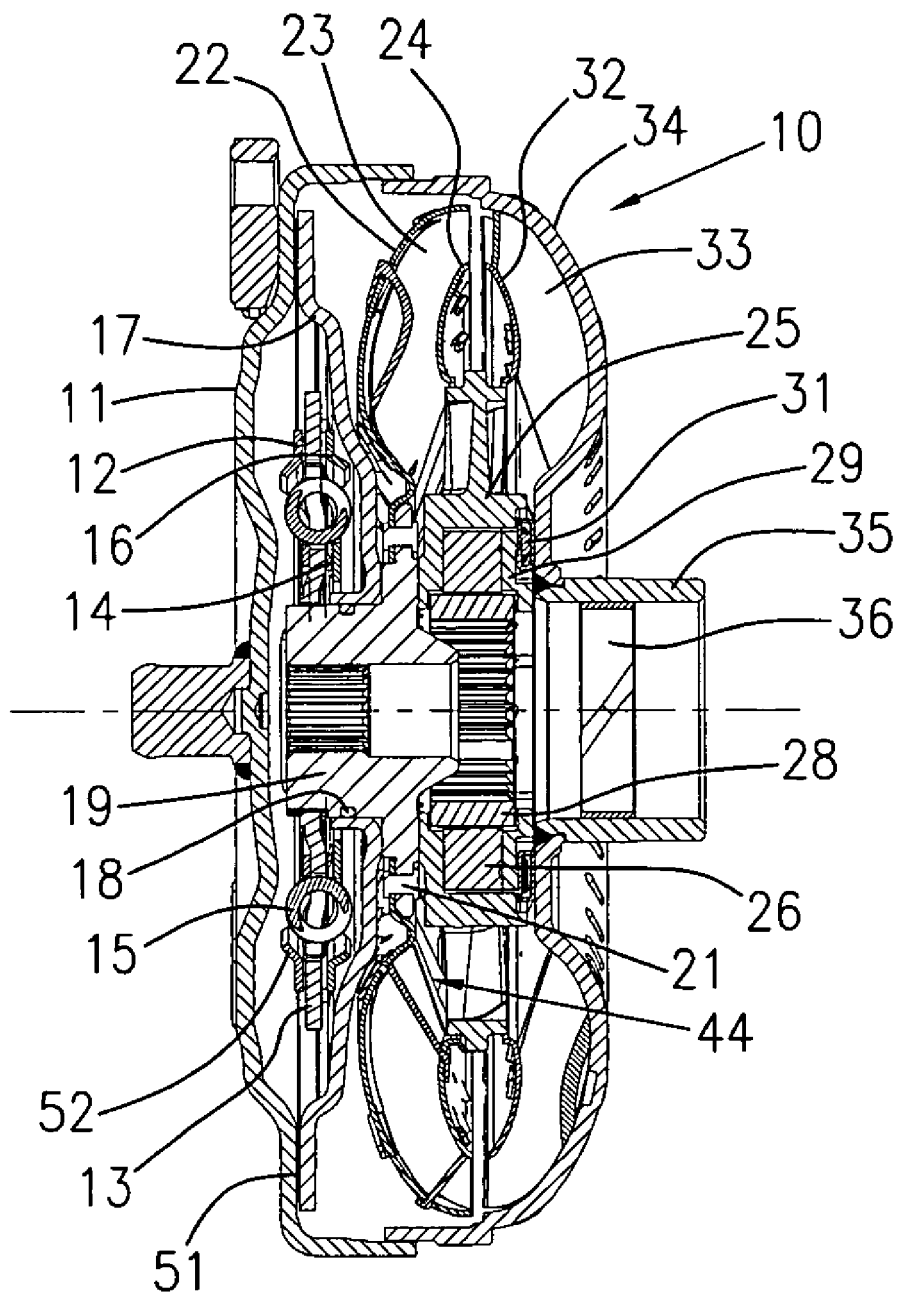
FIG. 4 is a cross-sectional view of the torque converter shown in FIGS. 2 and 3, taken generally along line 4-4 in FIG. 3.
Figure 5:
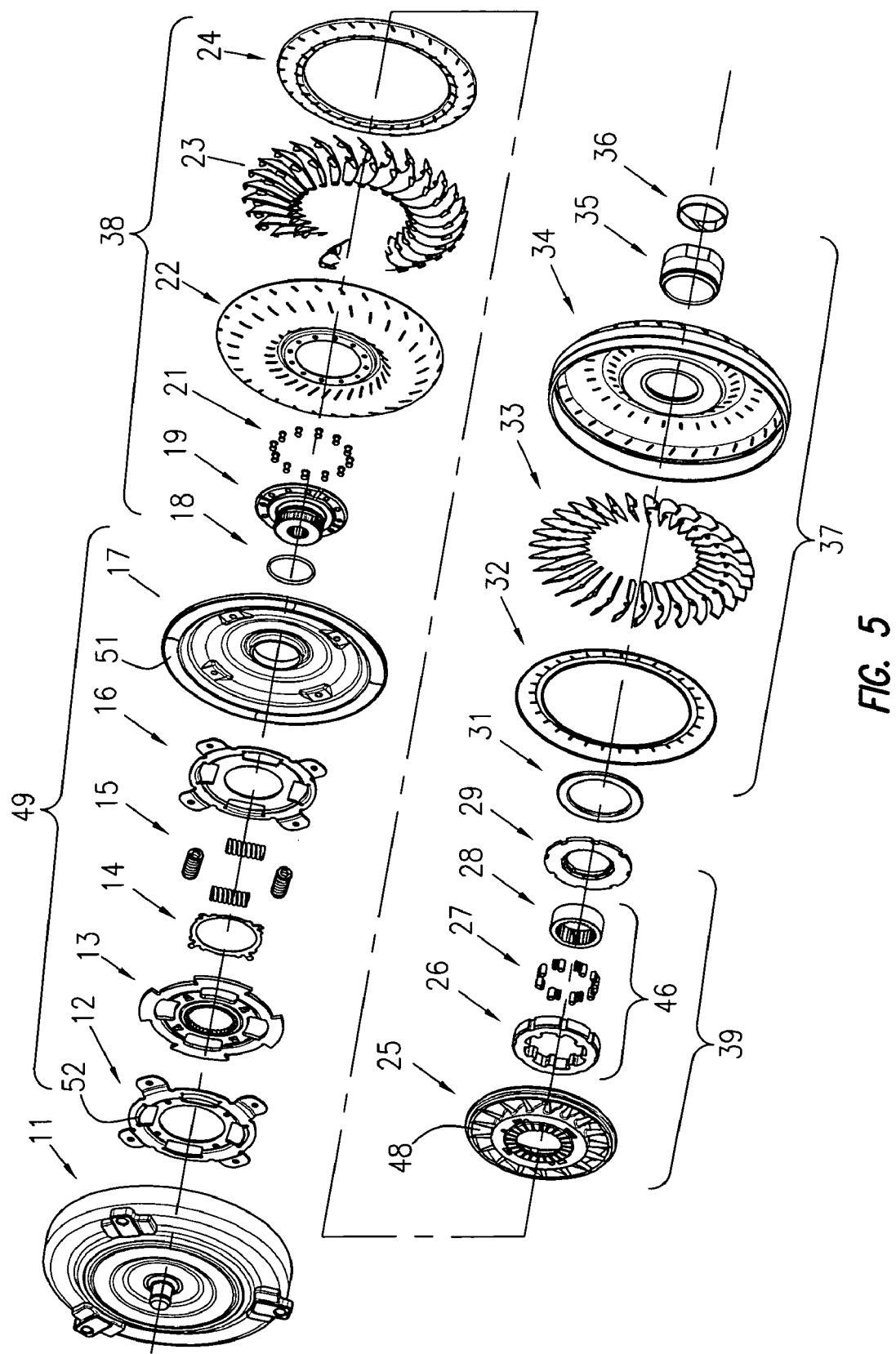
FIG. 5 is a first exploded view of the torque converter shown in FIG. 2, as shown from the perspective of one viewing the exploded torque converter from the left.
Figure 6:
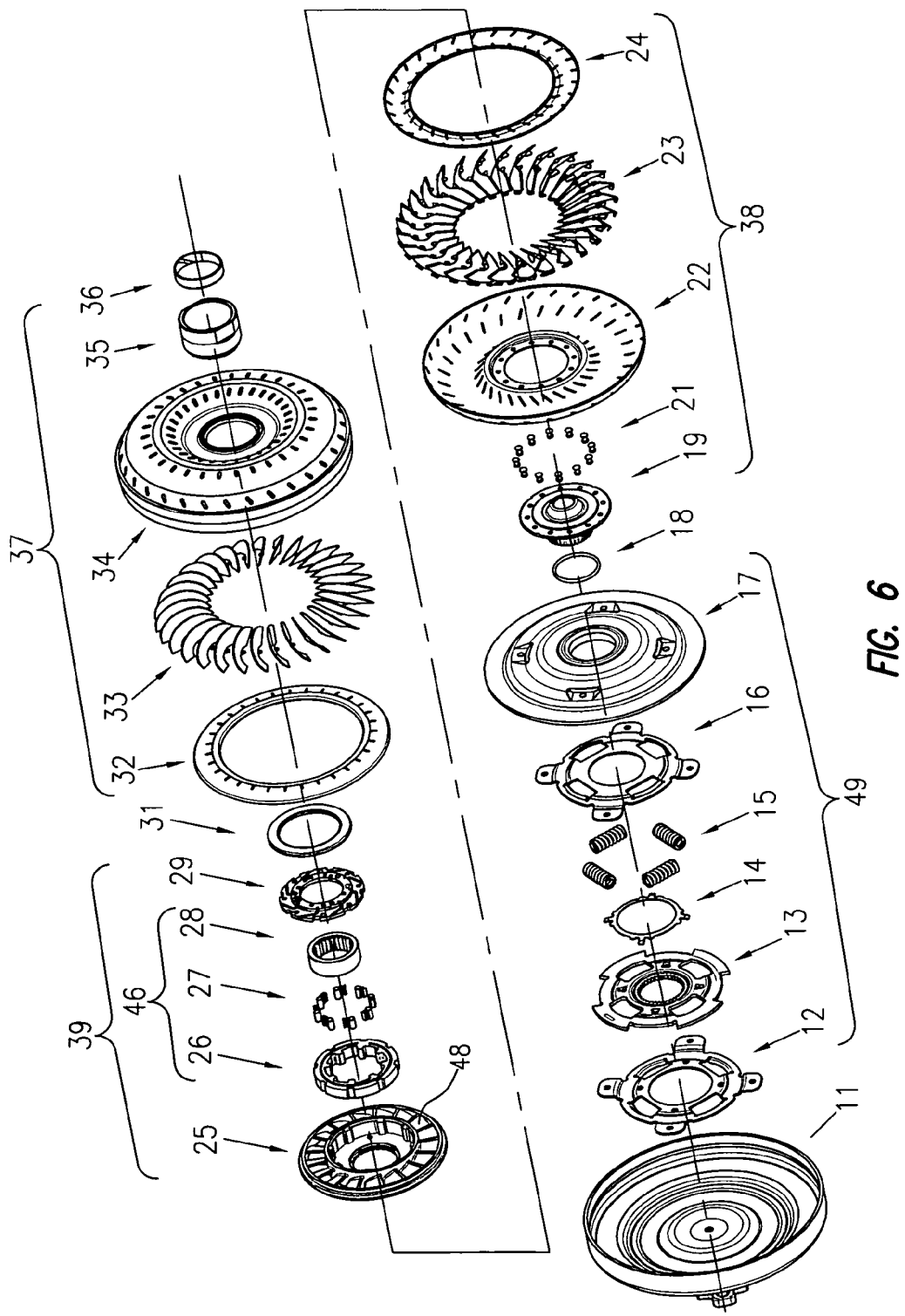
FIG. 6 is a second exploded view of the torque converter shown in FIG. 2, as shown from the perspective of one viewing the exploded torque converter from the right.
Figure 7A:
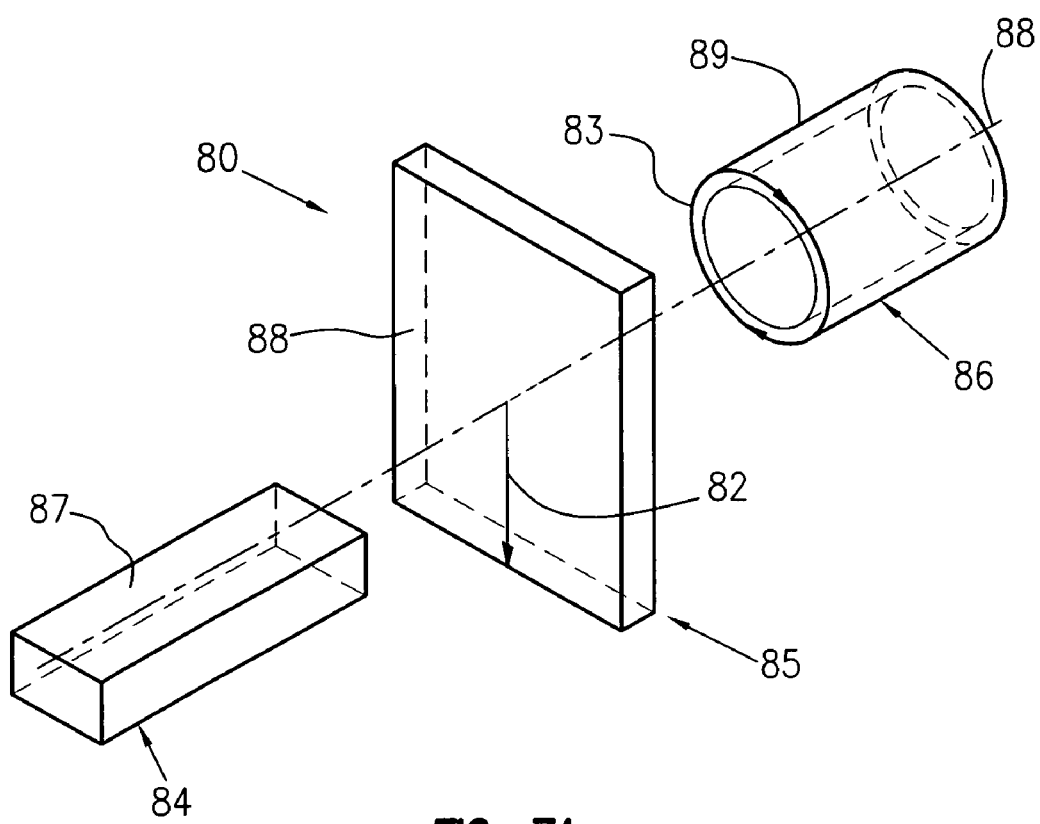
FIG. 7A is a perspective view of a cylindrical coordinate system demonstrating spatial terminology used in the present application.

FIG. 7A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 7B:
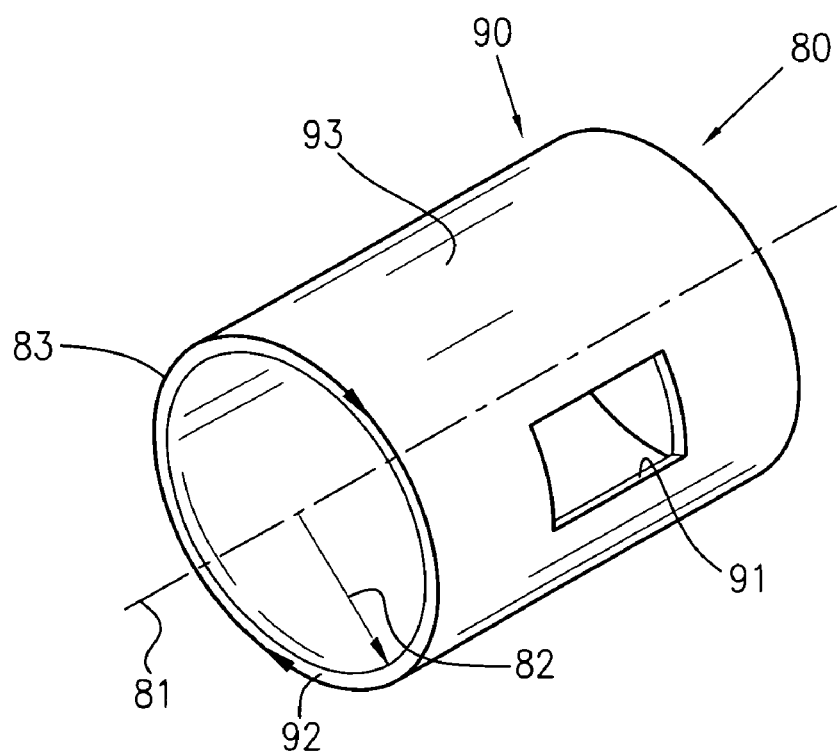
FIG. 7B is a perspective view of an object in the cylindrical coordinate system of FIG. 7A demonstrating spatial terminology used in the present application.

FIG. 7B is a perspective view of object 90 in cylindrical coordinate system 80 of FIG. 7A demonstrating spatial terminology used in the present application. Cylindrical object 90 is representative of a cylindrical object in a cylindrical coordinate system and is not intended to limit the present invention is any manner. Object 90 includes axial surface 91, radial surface 92, and circumferential surface 93. Surface 91 is part of an axial plane, surface 92 is part of a radial plane, and surface 93 is part of a circumferential plane.

Figure 8:
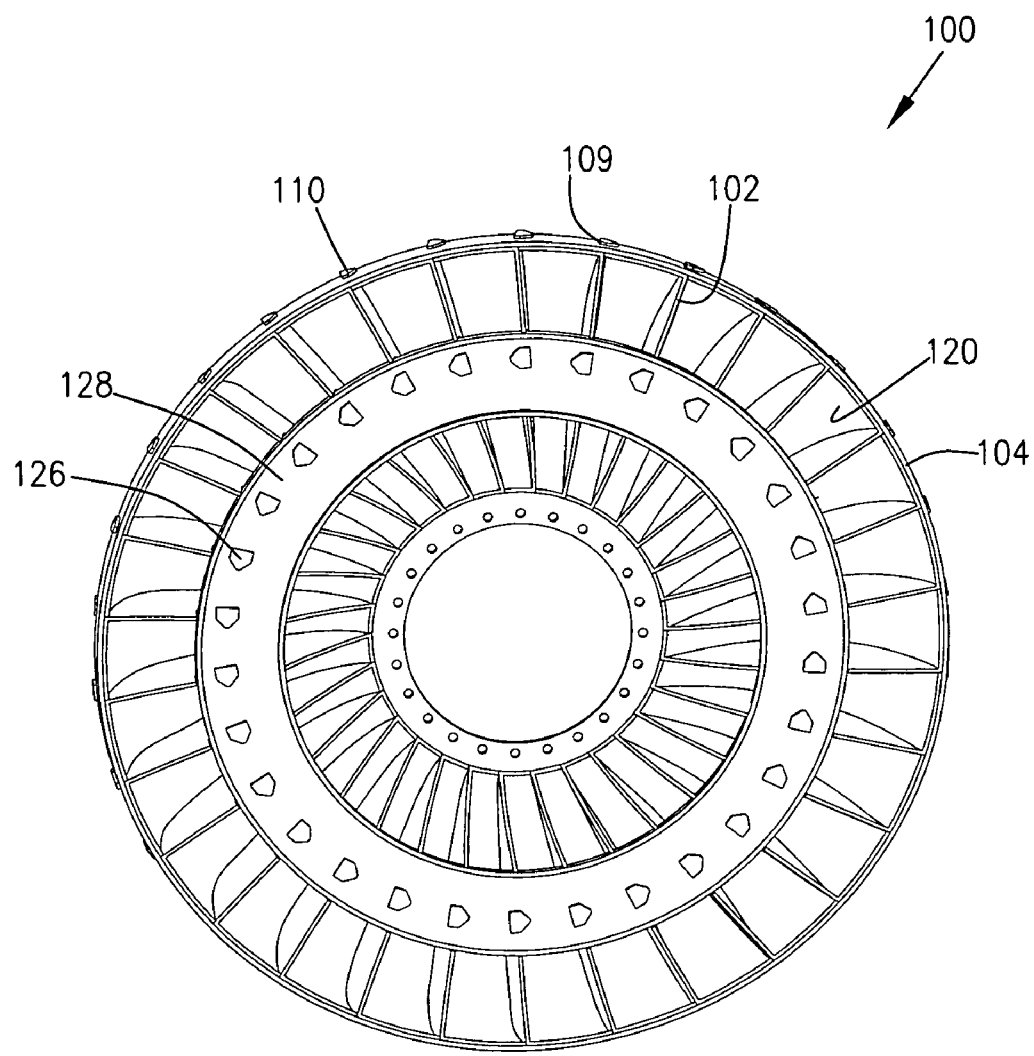
FIG. 8 is a perspective view of a torque converter turbine having a plurality of present invention blades arranged therein.
Figure 9:
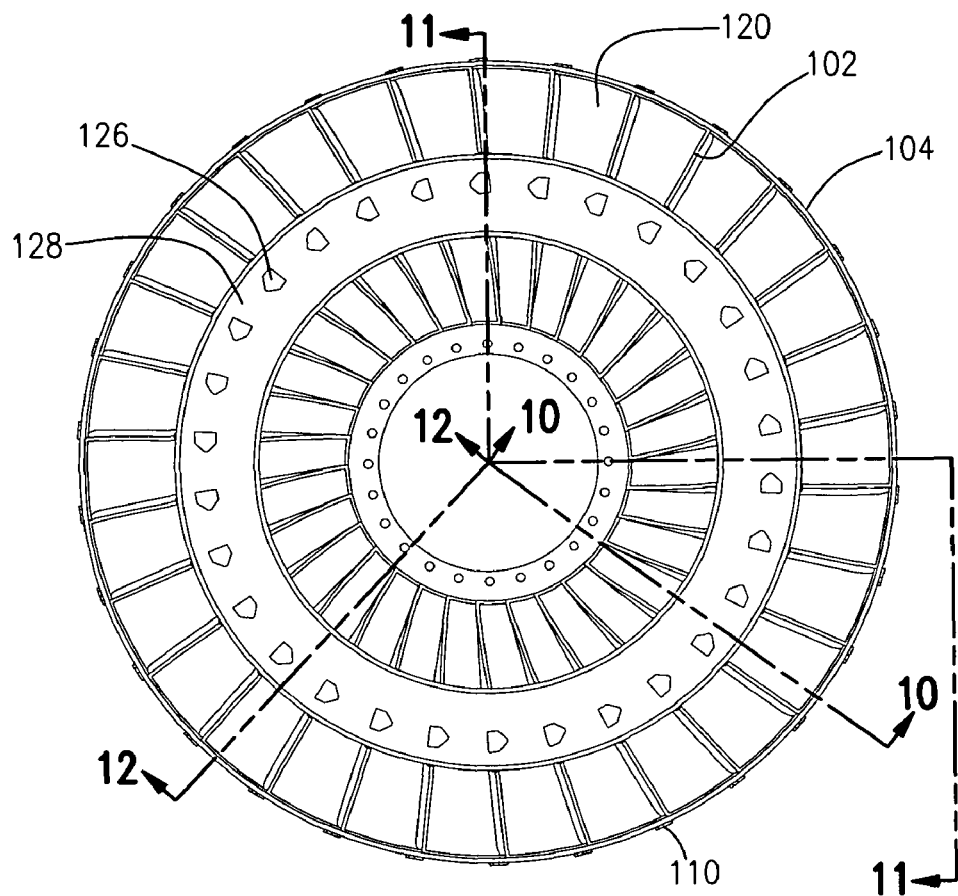
FIG. 9 is a top plan view of the torque converter turbine of FIG. 8 having a plurality of present invention blades arranged therein.
Figure 10:
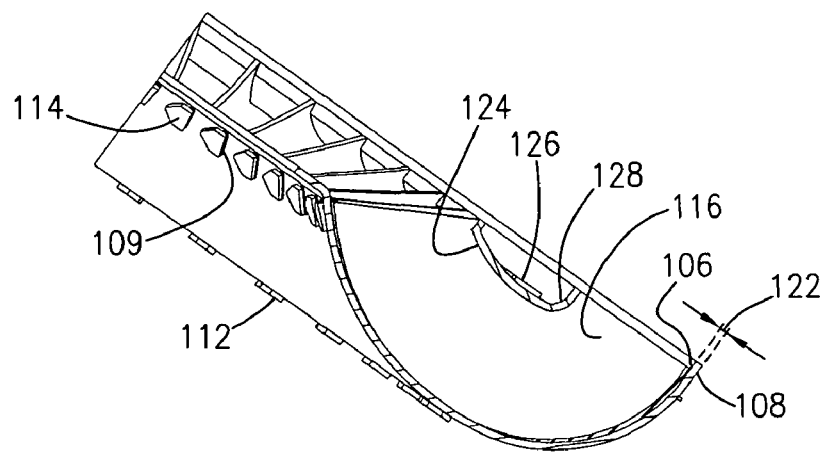
FIG. 10 is a cross sectional view of the torque converter turbine of FIGS. 8 and 9 taken generally along line 10-10 in FIG. 9.

Adverting now to the other figures, FIG. 8 shows a perspective view of torque converter turbine 100 having a plurality of present invention blades 102 arranged therein and FIG. 9 shows a top plan view of torque converter turbine 100 having a plurality of present invention blades 102 arranged therein. FIG. 10 shows a cross sectional view of torque converter turbine 100 taken generally along line 10-10 in FIG. 9, FIG. 11 shows a cross sectional view of torque converter turbine 100 taken generally along line 11-11 in FIG. 9, and FIG. 12 shows a cross sectional view of torque converter turbine 100 taken generally along line 12-12 in FIG. 9. The following discussion is best understood in view of FIGS. 8 through 12.

Although the embodiments shown in the figures depict a torque converter turbine, one of ordinary skill in the art will recognize that the present invention torque converter blade and its arrangement may also used in constructing a torque converter pump, and such variations are within the spirit and scope of the claimed invention. In view of the foregoing, torque converter turbine 100 comprises shell 104 having inner and outer surfaces 106 and 108, respectively, and at least two slots arranged therethrough, e.g., slots 109. As is appreciated in view of the figures, the slots are arranged so that tabs 110, 112 and 114 may be disposed therethrough; however, after tabs 110, 112 and 114 are bent into engaged positions, as shown in FIGS. 8 through 12, the respective slots are essentially concealed from view. Thus, the slots formed within shell 104 are only partially shown. Torque converter turbine 100 further comprises blade 102 including body 116 having outer edge 118 arranged to conform to inner surface 106 of shell 104, surface 120 extending from outer edge 118, and at least two tabs extending from surface 120, e.g., tabs 110, 112 and 114. Surface 120 is also arranged to conform to inner surface 106 of shell 104 to provide a fluid seal, which aspect is discussed in greater detail infra. As described above, blades 102 comprise at least two tabs, and such tabs are disposed through the at least two slots in shell 104 and at least one of the at least two tabs is arranged to engage outer surface 108.

Each of the at least two slots has a depth, i.e., thickness 122, and each of the at least two tabs has a length (discussed infra). In order for at least one of the at least two tabs to engage outer surface 108 as described above, the length of at least one of the at least two tabs is greater than the depth of at least one of the at least two slots. In some embodiments, surface 120 extends substantially perpendicularly from body 116. It has been found that other arrangements of surface 120 relative to body 116 are also possible, e.g., an acute angle therebetween, such embodiments are discussed below in greater detail and are within the spirit and scope of the claimed invention. Body 116 further comprises inner edge 124 having at least one tab, e.g., tab 126, arranged to engage core ring 128.

In yet other embodiments, the present invention comprises torque converter turbine 100 including shell 104 comprising inner and outer surfaces 106 and 108, respectively, and at least two slots arranged therethrough, e.g., slots 109. Torque converter turbine 100 also includes blade 102 comprising body 116 having outer edge 118, surface 120 extending from outer edge 118 and at least two tabs, e.g., tabs 110, 112 and 114, extending from surface 120. Similar to the embodiments described above, outer edge 118 and surface 120 are arranged to conform to inner surface 106 of shell 104. In this embodiment, the torque converter also includes a fluid seal comprising interface 129 between inner surface 106 of shell 104 and surface 120 extending from outer edge 118. Again, similar to the embodiments described above, the at least two tabs, e.g., tabs 110, 112 and 114, are disposed through the at least two slots and at least one of the at least two tabs is arranged to engage outer surface 108.

Figure 15:
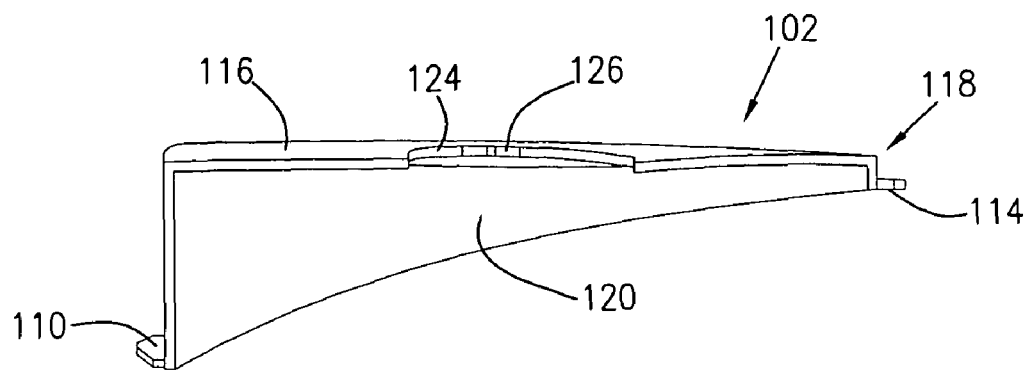
FIG. 15 is a top plan view of the torque converter blade of FIG. 13.
Figure 16:
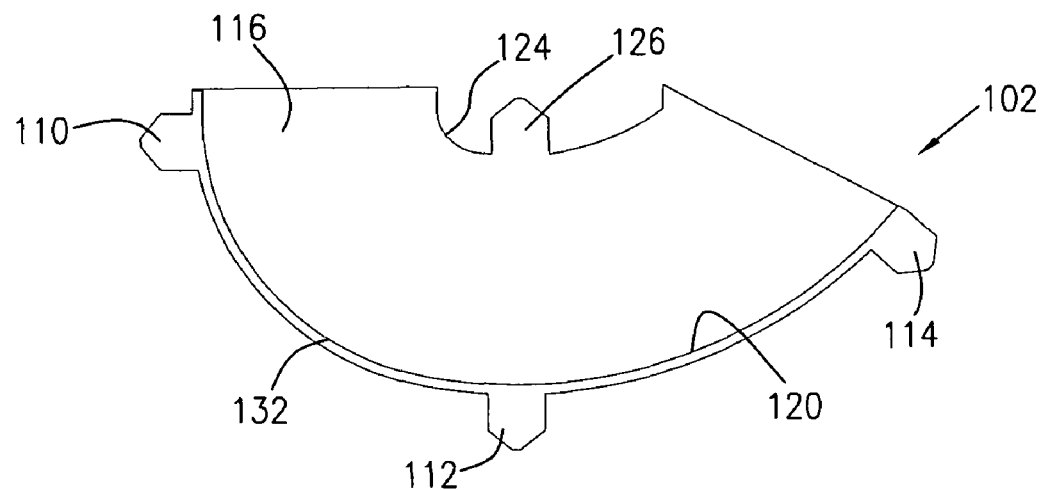
FIG. 16 is a side elevational view of the torque converter blade of FIG. 13; and, FIG. 17 is a cross sectional view of a torque converter turbine having a second embodiment of present invention torque converter blades arranged therein.

FIG. 13 shows a perspective view of a present invention torque converter blade 102, while FIG. 14 shows a front elevational view of torque converter blade 102, FIG. 15 shows a top plan view of torque converter blade 102 and FIG. 16 shows a side elevational view of torque converter blade 102. The following discussion is best understood in view of FIGS. 8 through 16.

In some embodiments, blade 102 includes body 116 comprising outer edge 118. Outer edge 118 is arranged to conform to inner surface 106 of shell 104. As described above, shell 104 comprises at least two slots, e.g., slots 109, arranged therethrough. Surface 120 extends from outer edge 118 and comprises at least two tabs, e.g., tabs 110, 112 and 114. Surface 120 is arranged to conform to inner surface 106 of shell 104 to provide a fluid seal, the at least two tabs are disposed through the at least two slots and at least one of the at least two tabs is arranged to engage outer surface 108 of shell 104. It should be appreciated that by including surface 120, the contact area between blade 102 and inner surface 106, i.e., interface 129, is greatly increased, and that this increased contact area in combination with surface 120 being arranged to conform to inner surface 106, provides a fluid seal far superior to the arrangements described in the BACKGROUND OF THE INVENTION. Thus, as fluid passes from the pump to the turbine, or alternatively from the turbine to the pump, kinetic energy losses are minimized due to minimization of fluid leaking between blade 102 and inner surface 106.

As described above, the slots formed in shell 104 each have a depth equivalent to thickness 122, while each of tabs 110, 112 and 114 have a length, e.g., length 130. In order for blades 102 to be positioned within shell 104 so that at least one of the at least two tabs are arranged to engage outer surface 108, length 130 must be greater than thickness 122. Although in the embodiments shown in the figures, each of tabs 110, 112 and 114 has a common length 130, one of ordinary skill in the art will recognize that each tab may have a unique length or shape, provided that the length of at least one of the at least two tabs is greater than thickness 122, and such variations are within the spirit and scope of the claimed invention. As can be appreciated in view of FIGS. 14 and 16, tabs 110, 112 and 114 extend from edge 132 of surface 120, i.e., the edge of surface 120 opposite outer edge 118 of body 116. It should be appreciated that an additional benefit of the arrangement of the at least two tabs extending from edge 132 is that as a fluid exerts a force against body 116, surface 120 provides added stability and helps prevent movement of blade 102 relative to shell 104.

Figure 17:
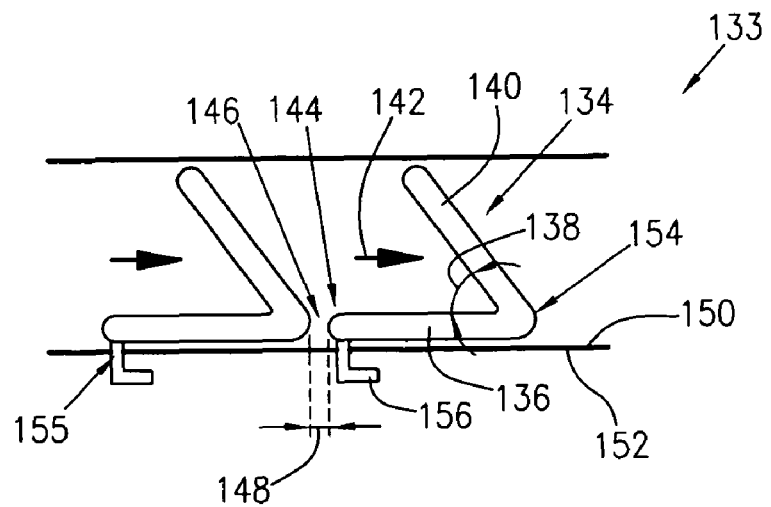

FIG. 17 shows a cross sectional view of torque converter turbine 133 having a second embodiment of present invention torque converter blades 134 arranged therein. The following discussion is best understood in view of FIGS. 8 through 17.

As described above and as can be most clearly seen in the embodiment shown in FIG. 14, surface 120 may extend substantially perpendicularly from body 116. While in other embodiments, e.g., the embodiment shown in FIG. 17, surface 136 may form acute angle 138 relative to body 140. In the embodiments, having the acute angle between the surface and the body, the oil flow, i.e., the flow shown by uni-directional arrows 142, is quite smooth, and as a result the torque converter efficiency can be maintained. An additional benefit of the present invention torque converter blade is that in some embodiments end 144 of surface 136 is proximate to the adjacent blade 134. By minimizing gap 146, or in other words distance 148 between end 144 and the adjacent blade 134, the gap available for fluid leakage between blades 134 and inner surface 150 is minimized, thereby improving the overall torque converter efficiency, and as a result, the fluid path goes away from gap 146.

In addition to the embodiments set forth above, the present invention also broadly comprises a method for assembling a blade, e.g., blades 102 or 134, in a torque converter shell, e.g., shell 104. The shell comprises inner and outer surfaces, e.g., inner surfaces 106 or 150 and outer surfaces 108 or 152, and at least two slots arranged therethrough, e.g., slots 109 or 155. The blade comprises a body, e.g., body 116 or 140, having an outer edge, e.g., outer edge 118 or 154, arranged to conform to the inner surface of the shell, a surface extending from the outer edge, e.g., surface 120 or 136, and at least two tabs extending from the surface, e.g., tabs 110, 112, 114 or 156. As described supra, the surface is arranged to conform to the inner surface of the shell. In some embodiments, the method according to the present invention comprises the steps of: a) inserting the at least two tabs through the at least two slots; and, b) bending at least one of the at least two tabs to engage the outer surface and retain the surface extending from the outer edge against the inner surface of the shell, while in other embodiments, the method further comprises the step of: c) providing a fluid seal between the surface extending from the outer edge and the inner surface of the shell.

Thus, it is seen that the objects of the present invention are efficiently obtained, although modifications and changes to the invention should be readily apparent to those having ordinary skill in the art, which modifications are intended to be within the spirit and scope of the invention as claimed. It also is understood that the foregoing description is illustrative of the present invention and should not be considered as limiting. Therefore, other embodiments of the present invention are possible without departing from the spirit and scope of the present invention.

What I claim is:

1. A blade for a torque converter comprising:
   a body comprising an outer edge;
   said outer edge arranged to conform to an inner surface of a shell in said torque converter, said shell comprising at least two slots arranged therethrough; and, a surface extending from said outer edge, said surface comprising at least two tabs, wherein said surface is arranged to conform to said inner surface of said shell to provide a fluid seal, said at least two tabs are disposed through said at least two slots and at least one of said at least two tabs is arranged to engage an outer surface of said shell.

2. The blade of claim 1 wherein each of said at least two slots has a depth and at least one of said at least two tabs has a length greater than said depth of at least one of said at least two slots.

3. The blade of claim 1 wherein said surface extends substantially perpendicularly from said body.

4. The blade of claim 1 wherein an angle formed between said surface and said body is acute.

5. The blade of claim 1 wherein said at least two tabs extend from an edge of said surface opposite said outer edge of said body.

6. The blade of claim 1 wherein said body further comprises an inner edge having at least one tab arranged to engage a core ring.

7. The blade of claim 1 wherein said shell is a turbine shell or a pump shell.

8. A torque converter comprising:
a shell comprising inner and outer surfaces and at least two slots arranged therethrough; and,
a blade comprising a body having an outer edge arranged to conform to said inner surface of said shell, a surface extending from said outer edge, and at least two tabs extending from said surface, wherein said surface is arranged to conform to said inner surface of said shell to provide a fluid seal, said at least two tabs are disposed through said at least two slots and at least one of said at least two tabs is arranged to engage said outer surface.

9. The torque converter of claim 8 wherein each of said at least two slots has a depth and at least one of said at least two tabs has a length greater than said depth of at least one of said at least two slots.

10. The torque converter of claim 8 wherein said surface extends substantially perpendicularly from said body.

11. The torque converter of claim 8 wherein an angle formed between said surface and said body is acute.

12. The torque converter of claim 8 wherein said at least two tabs extend from an edge of said surface opposite said outer edge of said body.

13. The torque converter of claim 8 wherein said body further comprises an inner edge having at least one tab arranged to engage a core ring.

14. The torque converter of claim 8 wherein said shell is a turbine shell or a pump shell.

15. A torque converter comprising:
a shell comprising inner and outer surfaces and at least two slots arranged therethrough;
a blade comprising a body having an outer edge and a surface extending from said outer edge and at least two tabs extending from said surface, said outer edge and said surface arranged to conform to said inner surface of said shell; and,
a fluid seal comprising an interface between said inner surface of said shell and said surface extending from said outer edge, wherein said at least two tabs are disposed through said at least two slots and at least one of said at least two tabs is arranged to engage said outer surface.

16. The torque converter of claim 15 wherein each of said at least two slots has a depth and at least one of said at least two tabs has a length greater than said depth of at least one of said at least two slots.

17. The torque converter of claim 15 wherein said surface extends substantially perpendicularly from said body.

18. The torque converter of claim 15 wherein an angle formed between said surface and said body is acute.

19. The torque converter of claim 15 wherein said at least two tabs extend from an edge of said surface opposite said outer edge of said body.

20. The torque converter of claim 15 wherein said body further comprises an inner edge having at least one tab arranged to engage a core ring.

21. The torque converter of claim 15 wherein the shell is a turbine shell or a pump shell.

22. A method for assembling a blade in a torque converter shell, said shell comprising inner and outer surfaces and at least two slots arranged therethrough; and, said blade comprising a body having an outer edge arranged to conform to said inner surface of said shell, a surface extending from said outer edge, and at least two tabs extending from said surface, wherein said surface is arranged to conform to said inner surface of said shell, said method comprising the steps of:
  a) inserting said at least two tabs through said at least two slots; and,
  b) bending at least one of said at least two tabs to engage said outer surface and retain said surface extending from said outer edge against said inner surface of said shell.

23. The method for assembling a blade in a torque converter of claim 22, further comprising the step of:
  c) providing a fluid seal between said surface extending from said outer edge and said inner surface of said shell.

24. The method for assembling a blade in a torque converter of claim 22, wherein each of said at least two slots has a depth and at least one of said at least two tabs has a length greater than said depth of at least one of said at least two slots.

25. The method for assembling a blade in a torque converter of claim 22, wherein said surface extends substantially perpendicularly from said body.

26. The method for assembling a blade in a torque converter of claim 22, wherein an angle formed between said surface and said body is acute.

27. The method for assembling a blade in a torque converter of claim 22, wherein said body further comprises an inner edge having at least one tab arranged to engage a core ring.

28. The method for assembling a blade in a torque converter of claim 22, wherein said shell is a turbine shell or a pump shell.

* * * * *